United States Patent [19]

Kramer et al.

[11] Patent Number: 4,612,029
[45] Date of Patent: Sep. 16, 1986

[54] METHOD AND APPARATUS FOR PERFORMING IN-SITU VACUUM-ASSISTED METAL TO GLASS SEALING

[75] Inventors: Daniel P. Kramer, Dayton; Richard T. Massey, Hamilton, both of Ohio

[73] Assignee: The United States of America as represented by the United States Department of Energy, Washington, D.C.

[21] Appl. No.: 756,115

[22] Filed: Jul. 18, 1985

[51] Int. Cl.⁴ .............................................. C03B 27/02
[52] U.S. Cl. ........................................ 65/59.24; 65/34; 65/59.25; 65/59.34; 65/110; 65/139; 65/140; 65/154; 65/155
[58] Field of Search ....................... 65/34, 59.1, 59.25, 65/59.4, 81, 59.24, 110, 139, 140, 154, 155, 59.33, 59.34

[56] References Cited

U.S. PATENT DOCUMENTS

| | | | |
|---|---|---|---|
| 1,888,071 | 11/1932 | Case | 65/155 X |
| 2,030,185 | 2/1936 | Rose | 65/59.28 X |
| 2,075,057 | 3/1937 | Richardson | 65/59.28 |
| 2,454,834 | 11/1948 | Powers | 65/59.25 X |
| 2,478,812 | 8/1949 | Drake | |
| 2,486,101 | 10/1949 | Beggs | 65/59.34 X |
| 2,775,068 | 12/1956 | McDuffee | |
| 3,287,097 | 11/1966 | Limpel | 65/40 |
| 3,299,502 | 1/1967 | Wanesky | |
| 4,066,428 | 1/1978 | Günther | 65/81 X |
| 4,292,464 | 9/1981 | Vogt et al. | 65/29.6 X |

Primary Examiner—Robert Lindsay
Attorney, Agent, or Firm—James H. Chafin; Albert Sopp; Judson R. Hightower

[57] ABSTRACT

A method and apparatus for assembling and fusing glass to metal in a glass-metal electrical component is disclosed. The component includes a metallic shell formed with upper and lower cylindrical recesses connected together by longitudinal passages, a pair of metal rings and plural metal pins assembled to define electrical feed-throughs. The component parts are assembled on a fixture having a sleeve-like projection and a central mounting projection establishing concentric nesting surfaces to which the metal rings are slip-fitted in concentric alignment with each other spaced from sidewalls of the lower recess. The pins are in electrical contact with the metal rings. A glass pre-form is seated within the upper recess. The assembled structure is heated to a temperature sufficient to melt the glass pre-form which flows under gravity through the passages into the lower recess to provide an insulative seal between the metal parts. The gravity flow of glass is assisted by applying vacuum to the lower recess, ensuring that all spaces between the metal parts are filled with sealing glass without formation of bubbles.

11 Claims, 5 Drawing Figures

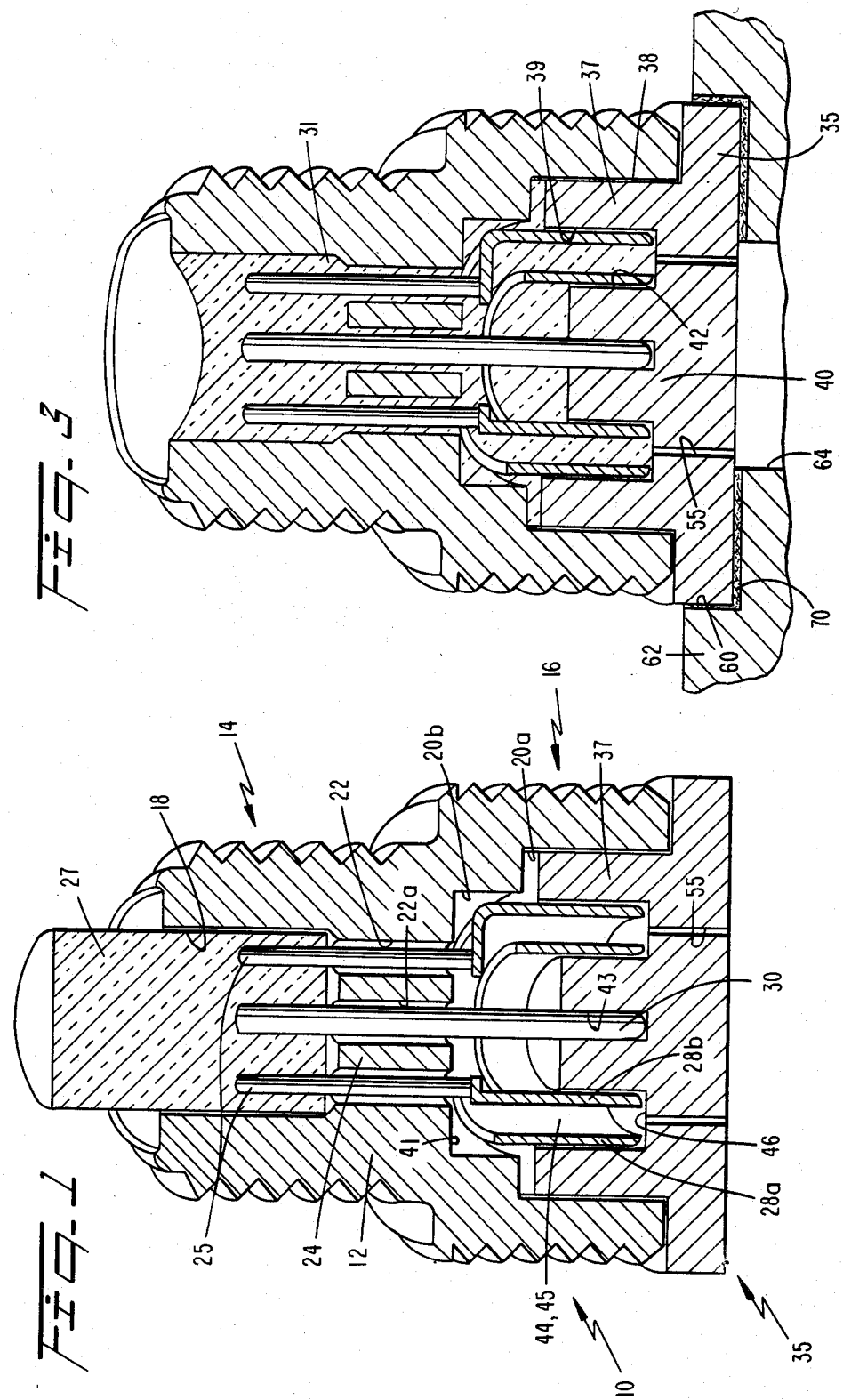

METHOD AND APPARATUS FOR PERFORMING IN-SITU VACUUM-ASSISTED METAL TO GLASS SEALING

FIELD OF THE INVENTION

The U.S. Government has rights in this invention pursuant to Contract No. DE-AC04-76DP00053 between the U.S. Department of Energy and Monsanto Research Corporation.

The present invention relates generally to apparatus for sealing glass to metal, and, more particularly, to a vacuum-assisted sealing process and a fixture for accurately positioning and fusing together a plurality of glass and metal parts.

BACKGROUND

In the manufacture of glass-metal electrical components used, for example, as an ignitor or actuator containing pyrotechnic material electrically detonated to perform work (e.g., to drive a piston), it is essential that various metal and glass parts thereof be accurately assembled and fused since any slight mis-alignment of parts may make the component inoperative.

One type of glass-metal electrical component that can be assembled with the present invention comprises a metallic shell formed with upper and lower cylindrical recesses communicating with each other through longitudinal passages formed within the shell body. A set of metal pins extending through the passages have upper and lower ends respectively terminating within the upper and lower recesses. These pins are embedded within glass, providing insulation between the shell and pins. Upper ends of the pins are connected to bridge wires in contact with pyrotechnic material sealed within the upper recess. Lower ends of the pins which are joined to cylindrical concentric metal sleeves are fixed within the lower recess with insulative glass to establish electrical feed-throughs which may be connected to a suitable plug for detonating the device.

Assembly of the aforesaid electrical component initially requires placement of the metal sleeves with or without welded pins within a fixture having nesting and stop surfaces for aligning the sleeves in spaced, concentric locations. Thereafter, the metal shell is fitted to other nesting surfaces within the fixture so that the metal sleeves are positioned within the lower recess spaced from the shell walls. A glass pre-form is then seated within the upper recess. The fixture and assembled component are then placed within a furnace, heated to melt the glass pre-form. The melted glass flows by gravity through the passages into the lower recess to provide an insulative seal between the shell and sleeve/pin configuration throughout the shell body.

Because of surface tension between the various component parts and the glass, the viscosity of the glass, and temperature limitations, complete glass flow often cannot occur, resulting in formation of a poor or incomplete glass-to-metal seal. Frequently, air pockets are trapped within the glass seal, reducing the superior insulating effect of the glass.

Weighted plungers have been used to improve the gravity flow of melted glass during the forming process. However, depending upon the spacing between the sleeve/pin configuration and the shell body, or employment of this sealing technique in other structures where glass or glass-ceramic-to-metal seals are necessary, there are circumstances where plungers do not allow the formation of reliable seals.

SUMMARY OF THE INVENTION

It is accordingly an object of the present invention to provide an improved method and apparatus for facilitating fabrication of glass-metal electrical components while ensuring accurate spatial relationship within the components.

Another object of the present invention is to provide a method and apparatus allowing for formation of complete glass-to-metal or glass-ceramic-to-metal seals by improving the flow of melted glass between the parts to be sealed.

Still a further object is to increase the speed at which the glass-metal seal is formed by assisting in the movement of molten glass, thereby decreasing energy costs in operating the furnace.

Yet a further object is to decrease the furnace temperatures required to form the seal so that temperatures are only slightly higher than the melting temperature of the glass.

Still another object is to provide a method and apparatus allowing for simultaneous fabrication of plural electrical components in a single heating operation.

Additional objects, advantages and novel features of the invention will be set forth in detail in part in the description which follows and in part will become apparent to those skilled in the art upon examination of the drawing or may be learned by practice of the invention. The objects and advantages of the invention may be realized and obtained by means of the instrumentalities and combinations particularly pointed out in the appended claims.

In accordance with the general features of the invention, a fixture is provided with a component assembly area for assembling and using glass to metal in a glass-metal electrical component typically having a metallic shell or strength member and a pair of metal sleeves and plural metal pins. The metal sleeves and pins are mounted within and spaced from sidewalls of the shell body by insulative sealing glass to establish electrical feed-throughs within a lower recessed portion of the component. The component assembly area, formed on an upper surface of the fixture, includes a central mounting projection formed concentrically within a sleeve-like mounting projection to establish an annular cavity between sidewalls of the projections.

The sidewalls define nesting surfaces enabling initial assembly of the component by mounting the pair of metal sleeves within the cavity so that the sleeves are concentrically spaced from each other in snug contact with the projections. The metallic shell is then fitted to the fixture plate by placing sidewalls of the lower recess into contact with an outer nesting surface of the sleeve-like projection maintaining the metal sleeves within and spaced from sidewalls from the lower recess. A glass pre-form is seated within an upper recess of the electrical component. Pins extend from the glass pre-form through the passages into aligned contact with the metal rings.

In accordance with the method of the invention, the fixture containing the initially assembled electrical component is then placed within a furnace in which the glass pre-form melts at a predetermined temperature. As the glass melts, suction is supplied through passages formed within the fixture in communication with the annular cavity formed between the mounting projections, to assist the gravity flow of molten glass. Glass thus flows through the shell passages in a sufficient quantity to substantially fill the annular cavity with glass sealing material, as well as an interior region between the metal sleeves and shell body and passages, thereby providing insulative separation between the metallic shell and the sleeves and pins.

Preferably, a fixture plate is provided, having a plurality of cylindrical recesses formed on an upper surface thereof into which the fixtures are respectively mounted. The mounted fixtures establish a plurality of component assembly areas spaced from each other on the plate upper surface for simultaneous assembly of plural electrical components. Vacuum passageways connect each component assembly area to a vacuum supply chamber formed within the fixture plate. The vacuum supply chamber is connected to a vacuum source for supplying equal amounts of suction to each component assembly area.

BRIEF DESCRIPTION OF THE DRAWINGS

FIG. 1 is a side sectional view of a glassmetal electrical component in an initially assembled state on a fixture constructed in accordance with the principles of the present invention;

FIG. 3 is a sectional view similar to FIG. 1 depicting the electrical component after heat is applied to form the glass seal;

DETAILED DESCRIPTION OF THE INVENTION

Figure 4:
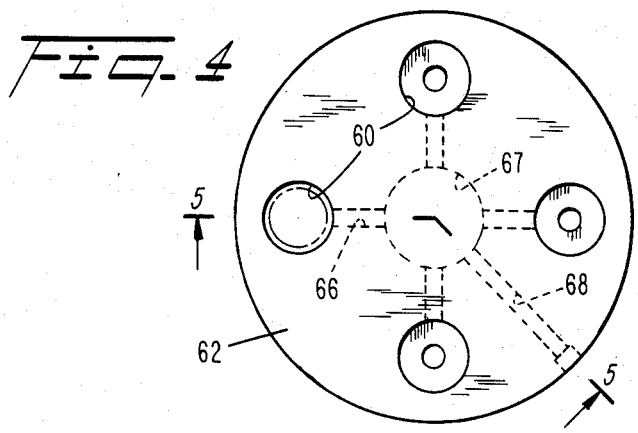
FIG. 4 is a top plan view of a fixture plate having plural component assembly areas permitting simultaneous formation of plural glass-metal electrical components.

Referring now to the drawing, FIG. 1 is an illustration of one type of glass-metal electrical component 10 assembled with the present invention, comprising a metal shell or strength member 12 having externally threaded upper and lower portions 14 and 16 of different diameters, respectively. The upper portion 14 includes a cylindrical recess 18 open to the upper end thereof. The larger diameter lower portion 16 is formed with a lower cylindrical recess 20 divided into large and small diameter recess portions 20a and 20b, respectively. The lower recess 20 communicates with upper recess 18 through a set of longitudinal passages 22 formed within a transversely extending body portion 24 of shell 12. A pair of metal pins 25 extending through passages 22 each have upper and lower ends respectively terminating within recesses 18,20.

More specifically, the upper ends of pins 25 are surrounded by two split cylindrical glass pre-forms 27 (only one is shown) seated within upper recess 18. Lower ends of pins 25 respectively are welded to a pair of metal rings 28a and 28b concentrically mounted within lower recess 20 to define electrical feed-throughs of component 10 as described hereinafter. A third pin 30 extending through a central passage 22a of body portion 24 also has upper and lower ends terminating respectively in recesses 18,20. However, the lower end of pin 30 projects outward from central passage 22a along the longitudinal axis of inner metal ring 28b a greater distance than pins 25 to define a third electrical feedthrough of component 10.

The pins 25,30 are of smaller diameter (approximately 0.020–0.030 inches) than the diameter (approximately 0.040–0.050 inches) of passages 22,22a and must remain spaced from the passage sidewalls to avoid electrical contact therewith. Similarly, it is important that metal rings 28a,28b be maintained in a predetermined spatial relationship with each other for proper electrical contact with pins 25 during assembly as described below. The rings 28a,28b also require precise positioning to avoid contact with each other as well as the sidewalls of recesses 20a,20b. To complete final assembly of component 10, the pins 25,30 and rings 28a,28b must be fused to shell 12 by melting glass pre-form 27 so that the melted glass flows downwardly through passages 22,22a into recesses 20a,20b to establish an insulative glass seal 31 as shown in FIG. 3. Sealing of the glass and metal parts together must occur while the parts are maintained in precise positional relationships with each other as described supra.

In accordance with the invention, component 10 is initially assembled on a fixture member 35 which may be formed of graphite. A raised sleeve-like cylindrical projection 37 projects upward from fixture 35 to define outer and inner cylindrical nesting surfaces 38,39 respectively. Outer nesting surface 38 has a diameter slightly less than the diameter of lower recess portion 20a to allow shell 12 to be slip-fitted onto sleeve-like projection 37. The inner nesting surface 39 has a diameter slightly greater than the outer diameter of metal ring 28a so that the latter can be slip-fitted against the inner nesting surface for proper co-axial alignment with the recess sidewall.

Central projection 40 is formed concentrically within sleeve-like projection 37 and includes a cylindrical nesting surface 42 having a diameter slightly less than the internal diameter of metal ring 28b slip-fitted onto the central projection for proper co-axial alignment with outer metal ring 28a. The outer diameter of central projection 40 is sufficiently less than the inner diameter of sleeve-like projection 37 so as to define an annular cavity 44 between the cylindrical sidewalls of these projections. Lower portions of metal rings 28a,28b are received within annular cavity 44 in slip-fitting contact with nesting surfaces 39,42 respectively, to establish an annular space 45 in communication with passages 22 through small diameter recess 20b.

To maintain proper axial spacing between the component parts, the height of sleeve-like projection 37 is less than the depth of large diameter recess 20a to permit a flow of melted glass into the inner end of the large diameter recess for improved sealing strength. The diameter of inner nesting surface 39 is less than the diameter of small diameter recess 20b to maintain spacing between outer ring 28a and shell 12 while permitting a flow of melted glass into the inner end portion of recess 20a as described supra. An endwall 46 of annular cavity 44 establishing a seat against which lower ends of rings 28a,28b are received, is spaced from endwall 41 of recess 20b, a distance greater than the height of the metal rings to maintain proper axial spacing and permit a free flow of melted glass from passages 22 into the lower recess as well as annular cavity 44.

Central projection 40 further includes a central hole 43 formed in co-axial alignment with central passage 22a. The lower end of central pin 30 is tightly received within hole 43 so that the pin is spaced from the passage sidewalls.

The component 10 is initially assembled upon fixture 35 by seating metal pin/ring assemblies consisting of 28a with 25 and 28b with 25 within annular cavity 44 so that the rings engage endwall 46 in snug contact with nesting surfaces 39,42. Metal shell 12 is then seated against the flat upper surface of fixture 35 by passing large diameter recess 20a into slip-fitting contact with outer nesting surface 38. Thereafter, glass pre-form 27 is seated within upper recess 18 on either side of pins 25,30 extending axially from the lower surface of the pre-form through passages 22,22a. The lower end of center pin 30 is snugly fitted within central hole 43.

The aforesaid assembled component and fixture can then be placed within a furnace 50 into which an inert atmosphere is introduced, such as argon gas. The furnace is gradually heated to a temperature of about 1000° C. Glass pre-form 27 has a melting point of approximately 940° C. and begins to melt after a predetermined time duration within the furnace.

Figure 2:
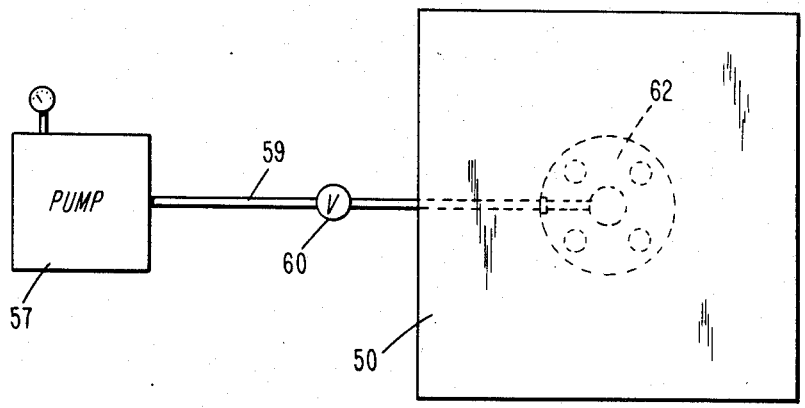
FIG. 2 is a schematic view of the overall apparatus used to form a glass seal within the electrical component.

In accordance with a unique feature of the invention, fixture 35 is formed with passageways 55 which are approximately 0.010 inches in diameter, having upper ends communicating with annular cavity 44 through endwall 46 and lower ends opening to the bottom of fixture 35. As shown schematically in FIG. 2, these passageways 55 are connected to a vacuum pump 57 through a vacuum line 59. After approximately 4 minutes at 1000° C., a valve 60 in line 59 is opened so that suction pressure of approximately 5 to 25 psia is applied to annular cavity 44 through passageways 55 for approximately 2 to 15 minutes, depending upon the type of glass, temperature and component configuration in which the seal is formed.

As glass pre-form 27 starts to melt, it flows by gravity from recess 18 into lower recess 20 through passages 22. This gravity flow of melted glass is assisted by the vacuum applied through passages 22 and lower recess 20 as a result of suction pressure within annular cavity 44. Thus, the melted glass is caused to flow into lower recess 20, completely filling annular cavity 44, inner end portions of large diameter recess 20a and small diameter recess 20b to seal the metal parts to shell 12 and maintain insulation therebetween.

A further advantage obtained by applying vacuum to improve the flow characteristics of melting glass is that of removing air bubbles that might otherwise remain trapped within the passages/recesses between the metal shell and rings or pins, resulting in air pockets within the seal having inferior insulation characteristics in comparison to the glass.

In the preferred embodiment of the present invention discussed supra, the diameter of passageways 55 is sufficiently small to prevent melting glass from entering the passageways. However, in light of the above disclosure, it will be obvious to one of ordinary skill in the art that the diameter of passageways 55 can be enlarged to allow melting glass to enter and completely fill the passageways, resulting in the formation of very fine glass fibers (not shown) of uniform diameter, upon cooling of the glass.

Figure 5:
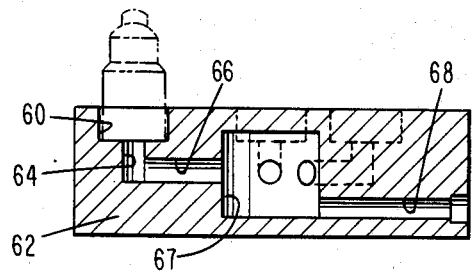
FIG. 5 is a sectional view taken along the line 5—5 of FIG. 4.

As shown in FIGS. 3, 4, and 5, fixtures 35 are preferably designed for insertion within a cylindrical recess 60 formed in an upper surface of a fixture plate 62. By forming plural recesses 60 at spaced locations from each other, fixture plate 62 provides multiple component assembly areas defined by individual fixtures 35. The bottom of each fixture 35 is open to a stepped recess or chamber 64 communicating with passageways 55. Each recess or chamber 64 is connected via passage 66 to a central vacuum reservoir 67 formed within fixture plate 62. A passageway 68 communicating with the central reservoir is suitably connected to a vacuum tube extending outside the furnace for connection to vacuum pump 57.

Central vacuum reservoir 67 ensures that during the in-situ vacuum-assisted processing of multiple components 10, an equal amount of vacuum is applied to each fixture 35. To provide proper sealing between the bottom of each fixture 35 with the associated mounting recess in plate 62, a graphite slurry 70 is employed to ensure that the vacuum is properly applied to the component through passageways 55.

The foregoing description of a preferred embodiment of the invention has been presented for purposes of illustration and description. It is not intended to be exhaustive or to limit the invention to the precise form disclosed. Other modifications or variations are possible in light of the above teachings. The embodiment was chosen and described in order to best illustrate the principles of the invention and its practical application to thereby enable one of ordinary skill in the art to best utilize the invention and various embodiments and with various modifications as are suited to the particular use contemplated. It is intended that the scope of the invention be defined by the claims appended hereto.

What is claimed is:

1. Apparatus for assembling and fusing glass to metal in a glass-metal electrical component having a metallic shell formed with upper and lower recesses connected together by longitudinal passages, a pair of metal rings and plural metal pins, said metal rings and pins being mounted within the lower recess and spaced from sidewalls thereof by insulative glass to establish electrical feed-throughs, comprising:

(a) a fixture formed with a component assembly area on an upper surface thereof, said component assembly area including a central mounting projection formed concentrically within a sleeve-like projection to establish an annular cavity between sidewalls of said projections respectively, said fixture enabling initial assembly of said component by (1) mounting said pair of metal rings within the cavity so that said rings are spaced from each other to define an annular space therebetween; (2) fitting said metallic shell into contact with an outer nesting surface of said first projection; and (3) seating a glass pre-form into the upper recess while inserting said pins extending from the glass pre-form through the passages into contact with the metal rings; said fixture being further formed with a passageway having one end communicating with said annular cavity;

(b) means for heating said initially assembled component to a predetermined temperature at which said glass pre-form melts; and (c) means connected to an opposite end of said passageway for vacuumizing said passages and lower recess by applying suction pressure to said annular cavity, said vacuumizing means assisting the flow of melted glass through said passages in a quantity sufficient to substantially fill said annular space with glass material, as well as an interior region between said metal rings and shell and said passages, thereby providing insulative separation between said metallic shell and said rings and pins.

2. Apparatus of claim 1, wherein said fixture includes a plurality of component assembly areas spaced from each other on the upper surface of said fixture for simultaneous assembly of plural electrical components, the passageways of each said component assembly area connected to a vacuum supply chamber formed within the fixture, said vacuum supply chamber being connected to said vacuumizing means for supplying equal amounts of suction pressure to each component assembly area.

3. Apparatus of claim 1, wherein said sleeve-like projection is cylindrical and has an outer diameter slightly less than the inner diameter of said lower recess to provide slip-fitting contact of said shell with a cylindrical nesting surface of said sleeve projection.

4. Apparatus of claim 3, wherein an inner cylindrical nesting surface of said sleeve-like projection has a diameter slightly greater than the outer diameter of one of said metal rings to provide slip-fitting contact therewith and aligned spacing between said one metal ring and the sidewall of said lower recess.

5. Apparatus of claim 4, wherein said central mounting projection is cylindrical and has an outer diameter slightly less than the inner diameter of said other metal ring to provide slip-fitting contact therewith and concentric spacing between said rings.

6. Apparatus of claim 5, wherein the height of said sleeve projection is less than the depth of the lower recess and less than the height of the metal ring to allow melted glass to flow around a portion of the outer metal ring to provide sealing contact with the recess.

7. Apparatus of claim 6, wherein the annular cavity is of sufficient depth to space upper ends of the metal rings from the bottom wall of the lower recess.

8. Apparatus of claim 7, wherein said central projection further includes a central hole formed in alignment with a central passage of said shell, and further including a third metal pin having a lower end snugly received within said hole to space the central pin from sidewalls of the central passage, said third pin defining a third electrical feed-through of said connector.

9. A metal-to-glass sealing fixture for assembling and fusing glass to metal in a glass-metal electrical component having a metallic shell formed with upper and lower cylindrical recesses connected together by longitudinal passages, a pair of metal rings and plural metal pins, said metal rings and pins being mounted within the lower cylindrical recess and spaced from sidewalls thereof by insulative glass to establish electrical feed-throughs, comprising a plate formed with a sleeve-like projection on an upper end thereof and a cylindrical mounting projection formed concentrically within said sleeve-like projection to establish an annular cavity between sidewalls of said projections respectively, said sidewalls defining cylindrical nesting surfaces to which said metal shells are fitted in concentric alignment and to which sidewalls of said lower recesses are slip-fitted to enclose said metal rings, and further including passageways formed within the fixture plate in communication with said annular cavity, said passageways being connectable to a source of suction to apply suction pressure to said passages and said lower recess to assist downward gravity flow of melting glass and thereby form an insulative seal within said electrical component.

10. Apparatus of claim 9, further comprising a mounting plate formed with recesses spaced from each other on an upper surface thereof, each recess respectively receiving one of said fixtures to establish plural component assembly areas on the upper surface of said mounting plate, internal passages formed within said mounting plate being in respective communication with said vacuum passageways in each fixture plate and a central vacuum supply chamber formed within said mounting plate, said vacuum supply chamber being connectable to a vacuum source for supplying equal amounts of suction to each component assembly area.

11. A method of assembling and fusing glass to metal in a glass-metal electrical component having a metallic shell formed with upper and lower recesses connected together by longitudinal passages, a pair of metal rings and plural metal pins mounted within and spaced from sidewalls of said shell by insulative sealing glass to establish electrical feed-throughs utilizing a fixture formed with a central mounting projection concentrically within a sleeve-like projection to establish an annular cavity therebetween with the sidewalls of said projections establishing nesting surfaces, comprising the steps of:

(a) mounting said rings to said nesting surfaces so that the rings are concentrically aligned with each other;

(b) fitting the lower recess of said metal shell into contact with an outer nesting surface of said sleeve-like projection so that the rings are concentrically spaced from sidewalls of said recess;

(c) passing the pins through the longitudinal passages into respective electrical contact with said inner and outer metal rings;

(d) seating a glass pre-form into the upper recess to complete initial assembly of said component;

(e) heating said initially assembled component and fixture to a predetermined temperature at which said glass pre-form melts; and (f) applying suction to said annular cavity to assist the gravity flow of melted glass through said passages in a quantity sufficient to substantially fill the annular cavity with glass material and a part of said lower recess to thereby provide insulative separation between said metallic shell and said rings and pins.

* * * * *